(12) United States Patent
Kloeckner (10) Patent No.: US 8,161,088 B2
(45) Date of Patent: Apr. 17, 2012

(54) POCKET CALCULATOR FOR FINANCIAL, MATHEMATICAL CALCULATION ROUTINES

(75) Inventor: Bernd W. Kloeckner, Berlin (DE)

(73) Assignee: FAF Verwaltungs GmbH, Koblenz (DE)

( * ) Notice: Subject to any disclaimer, the term of this patent is extended or adjusted under 35 U.S.C. 154(b) by 1267 days.

(21) Appl. No.: 11/816,950

(22) PCT Filed: Feb. 24, 2005

(86) PCT No.: PCT/EP2005/001935
§ 371 (c)(1),
(2), (4) Date: Aug. 23, 2007

(87) PCT Pub. No.: WO2006/099878
PCT Pub. Date: Sep. 28, 2006

(65) Prior Publication Data
US 2008/0281889 A1    Nov. 13, 2008

(51) Int. Cl.
*G06F 3/00* (2006.01)
(52) U.S. Cl. ........................ 708/145; 708/142
(58) Field of Classification Search .................. 708/145, 708/142
See application file for complete search history.

(56) References Cited

U.S. PATENT DOCUMENTS

| 4,016,411 | A | 4/1977 | Genin |
| 6,557,018 | B1 | 4/2003 | Hiroyki |

FOREIGN PATENT DOCUMENTS

DE    2643649    8/1977

OTHER PUBLICATIONS

RGPS: "StayOffHack 2.5" INET, Jan. 23, 2002 found at www.palmgear.com/index.cfm?fuseaction=software.showsoftware&prodid=3043>.
Hewlett Packard Company. "hp 10BII Finanzrechner—Benutzerhandbuch—1st Edition—HP item No. F1902?90008" INET, May 2003, XP002350318 found at h10023.www1.hp.com/ctg/Manual/c 00363269.pdf.

*Primary Examiner* — Tan V Mai (57) ABSTRACT

The invention relates to a pocket calculator for financial, mathematical calculation routines, comprising a keypad (11) comprising several input keys and function keys for the input of data, a memory which is used to memorise permanent data and volatile data, a processor which is used to carry out the financial, mathematical calculation routines and a display (12) which displays data. The keypad (11) comprises several function keys for a capital payment calculation routine, i.e. at least one first function key (P/YR) for the input and/or determination of periods per year, at least one second function key (N; x P/YR) for the input and/or determination of the total number of periods, a third function key (PV) for the input and/or determination of the start capital, a fourth function key (I/YR) for the input and/or determination of the rate of interest, a fifth function key (PMT) for the input and/or determination of rates per period and a sixth function key (FV) for the input and/or determination of the end capital. After the input of the data corresponding to a few of said function keys, the data of a non-used function key can be determined by the capital payment calculation routine. Also, the keypad (11) comprises additional function keys, that is, for the input and/or determination of data for a dynamised capital payment calculation routine.

10 Claims, 6 Drawing Sheets

POCKET CALCULATOR FOR FINANCIAL, MATHEMATICAL CALCULATION ROUTINES

The invention relates to a pocket calculator in accordance with the precharacterizing part of claims 1 and 10.

Financial mathematical pocket calculators which make use of the features of the precharacterizing part of claim 1 are known from the prior art, for example the pocket calculator sold by Hewlett Packard under the product name HP 10 BII. Thus, the financial mathematical pocket calculator HP 10 BII has a keypad for inputting data, a memory for storing permanent data and volatile data, a processor for performing financial mathematical calculation routines and a display for displaying data. The keypad of the financial mathematical pocket calculator HP 10 BII has a plurality of function keys for what is known as a capital repayment calculation routine. A capital repayment calculation routine is intended to be able to be understood to mean a savings plan calculation routine or a withdrawal plan calculation routine or a credit plan calculation routine or a leasing plan calculation routine or the like. The function keys for the capital repayment calculation routine are a first function key for inputting and/or determining the periods (for example saving periods, withdrawal periods) per annum, a second function key for inputting and/or determining the total number of periods, a third function key for inputting and/or determining the initial capital (for example initial payment in, initial payment out), a fourth function key for inputting and/or determining the interest rate, a fifth function key for inputting and/or determining the installments (for example savings installments, withdrawal installments) per period and a sixth function key for inputting and/or determining the final capital (for example final credit, remaining debt). When assignments have been made to five of these six function keys by inputting appropriate data, the data item for the function key without an assignment can be determined by the capital repayment calculation routine and can be visually displayed in the display by operating the relevant function key, except the request for the periods per annum.

The financial mathematical pocket calculators known from the prior art with a capital repayment calculation routine of this kind have the drawback that they have greatly restricted functionality. By way of example, the financial mathematical pocket calculator HP 10 BII has no devices which can be used to dynamize a capital repayment calculation routine. Financial consultants and investment consultants who use pocket calculators known from the prior art to advise customers in situ are therefore limited in their scope of consultancy, particularly when specific examples need to be calculated for the customer. This is disadvantageous.

On the basis of this, the present invention is based on the problem of providing a new kind of pocket calculator.

This problem is solved by a pocket calculator having the features of claim 1. In line with the invention, the keypad has further function keys, namely for inputting and/or determining data for a dynamized capital repayment calculation routine.

The invention firstly proposes a pocket calculator which can be used to perform dynamized capital repayment calculation routines by operating specially designed function keys, specifically within a very short time. To this end, the keypad of the inventive pocket calculator is expanded by special function keys which can be used to input and/or determine data for dynamized capital repayment calculation routines. The inventive financial mathematical pocket calculator has a significantly expanded functionality over the financial mathematical pocket calculators which are known from the prior art.

In addition or else alternatively, the keypad of the inventive pocket calculator may have function keys for a cashflow calculation routine, namely at least a first function key for inputting the initial capital, a second function key for inputting the number of periodic installments or withdrawals per time interval and a third function key for inputting the number of time intervals, where the first function key is preferably also used to input the periodic installment level or withdrawal level and to input the closing installment, and where when assignments have been made to these function keys by inputting relevant data it is possible to determine the data item for a function key without an assignment for the internal rate of return in the cashflow calculation routine. For the purposes of the invention, the keypad is expanded by function keys, namely by a function key for inputting reinvestment interest for the withdrawals and a function key for determining the true internal rate of return. This also expands the functionality of financial mathematical pocket calculators.

Preferred developments of the invention can be found in the subclaims and in the description below. The text below gives a more detailed explanation of an exemplary embodiment of the invention, without limiting it thereto, with the aid of the drawing, in which:

The text below gives a more detailed description of the present invention with reference to FIGS. 1 to 7.

Figure 1:
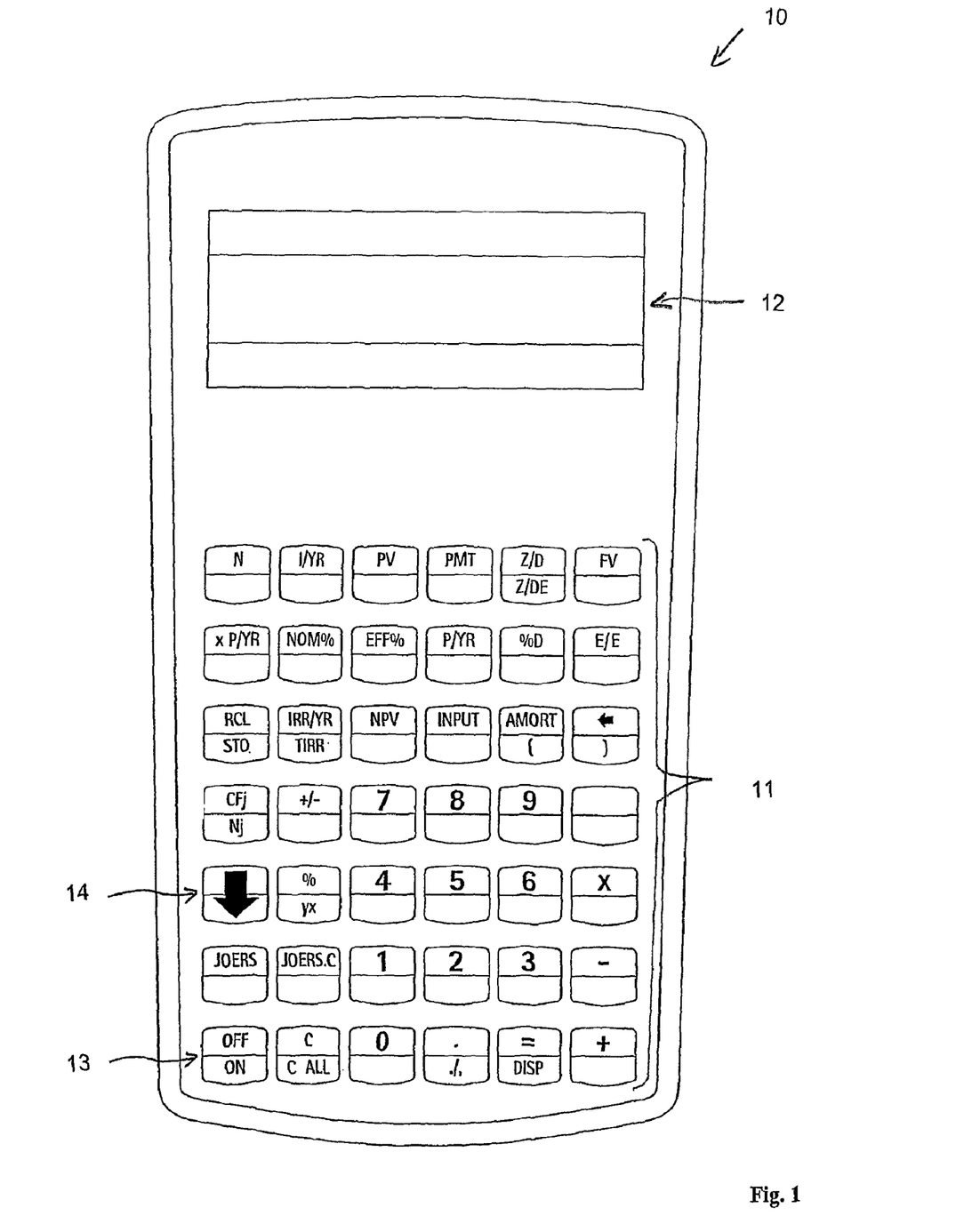
FIG. 1 shows a plan view of a pocket calculator based on the invention.

FIG. 1 shows a plan view of a financial mathematical pocket calculator 10 based on the invention which has a keypad 11, a display 12 and a memory and processor (not shown in the drawing). The keypad 11 of the inventive pocket calculator 10 has a plurality of input keys for inputting data and also a plurality of function keys for making assignments to and/or requesting variables in financial mathematical calculation routines. The memory of the pocket calculator 10, which is not shown, is used to store permanent and volatile data. The processor, which is likewise not shown, is used to perform the financial mathematical calculation routines, and the display 12 is used to display data.

As FIG. 1 reveals, the hardware of some of the function keys or input keys of the financial mathematical pocket calculator 10 is combined in one key. By way of example, the hardware of the on key ON and of the off key OFF on the keypad 11 is combined in a key 13. Accordingly, the key 13 has a dual assignment. By operating a separate shift key or dual assignment key 14 on the keypad 11, it is possible to change back and forth between the respective function keys or input keys of a key with a dual assignment. FIG. 1 shows the dual assignment key 14 as an arrow key, where when the dual assignment key 14 has been operated it is possible to select the function or function key shown on the respective key in the bottom half thereof.

If, when the dual assignment key 14 has been operated, another key on the keypad 11 is operated then the functionality of the dual assignment key 14 is automatically deactivated, so that the dual assignment function of the dual assignment key 14 is respectively active only for the subsequently operated key on the keypad 11. If the dual assignment key 14 has not been operated beforehand, only the function key or input key shown in the top half of a key can ever be selected.

In connection with the dual assignment of some keys on the keypad 11, a special feature of the inventive pocket calculator 10 is that the on key ON on the keypad 11 cannot be selected until the dual assignment key 14 has been operated previously. Only when the dual assignment key 14 has been operated is it accordingly possible to select the on function ON of the key 13, which makes it possible to prevent the inventive pocket calculator 10 from being turned on accidentally.

The keypad 11 of the inventive pocket calculator 10 has a plurality of function keys or input keys for a financial mathematical capital repayment calculation routine. A capital repayment calculation routine is intended to be able to be understood to mean a savings plan calculation routine or a withdrawal plan calculation routine or a credit plan calculation routine or a leasing plan calculation routine or the like.

The text below describes the functionality of the capital repayment calculation routine on the inventive pocket calculator by way of example using the example of a savings plan or a savings plan calculation routine, for which reason the text below uses the term savings plan calculation routine synonymously in place of the term capital repayment calculation routine. This is not intended to limit the invention to savings plan calculation routines, however.

These function keys for the capital repayment calculation routine or savings plan calculation routine include the function key P/YR for inputting and/or determining the periods—in this case saving periods—per annum, the function keys N and x P/YR for inputting and/or determining the total number of periods or saving periods, the function key PV for inputting and/or determining the initial capital, the function key I/YR for inputting and/or determining the interest rate, the function key PMT for inputting and/or determining the level or the absolute value of the installments—in this case savings installments—per period and also the function key FV for inputting and/or determining the final capital. When assignments have been made to five of these six function keys by inputting relevant data, the data item for a function key without an assignment can be determined by the savings plan calculation routine and can be visually displayed in the display 12. This is described below for a specific exemplary embodiment with reference to FIG. 2.

Figure 2:
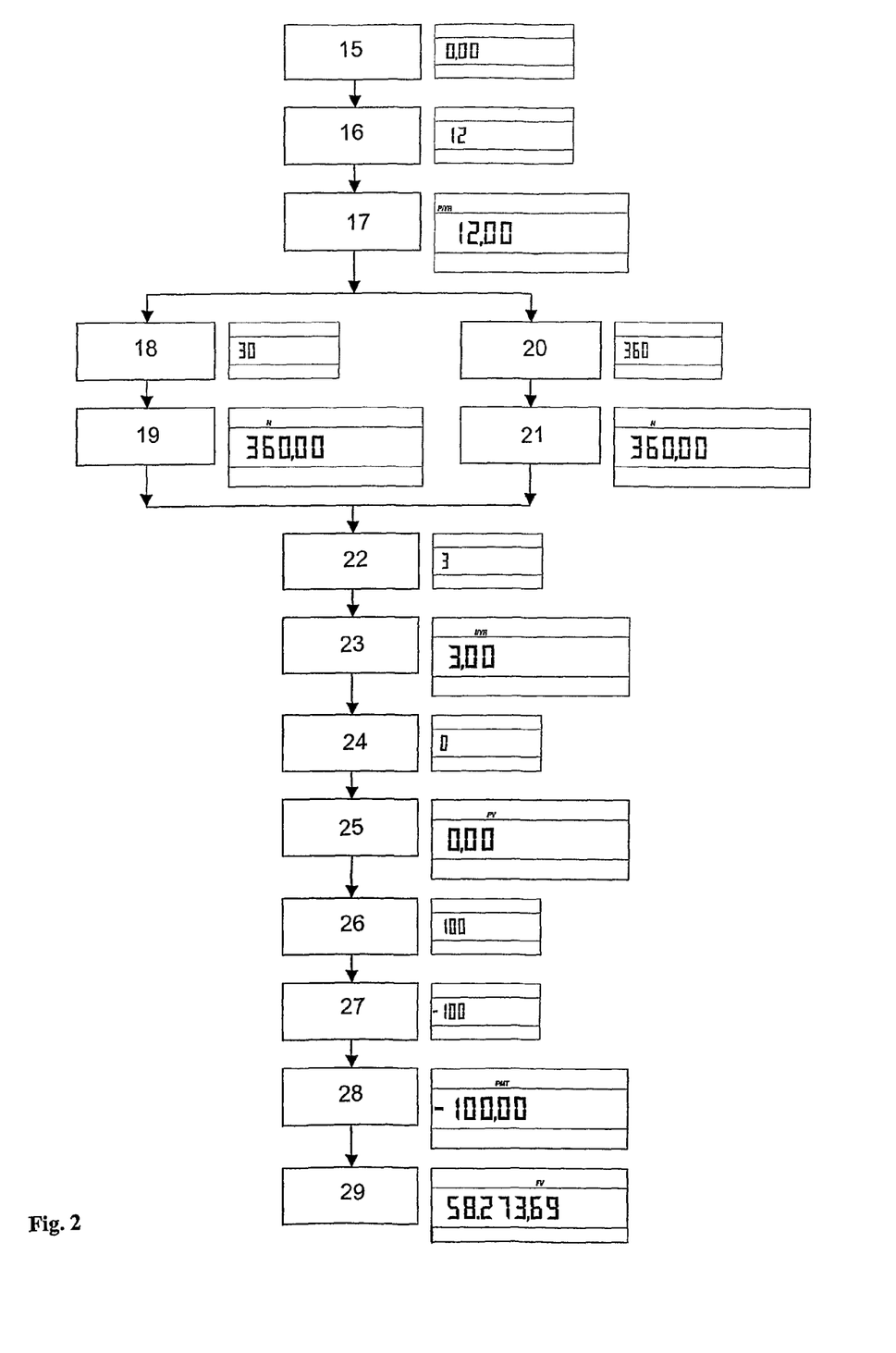
FIG. 2 shows a first flowchart to illustrate the way in which the inventive pocket calculator works.

In the example in FIG. 2, the functionality of the inventive pocket calculator 10 is described by way of example in connection with the savings plan calculation routine. In a step 15, which is not part of the savings plan calculation routine, the pocket calculator 10 is turned on by operating the dual assignment key 14 and by subsequently operating the key 13, and the display "0,00" then appears in the display 12. In a subsequent step 16, the first step of the savings plan calculation routine, the keypad 11 is used to input the number of saving periods per annum (in the example shown the data item "12"), and in the next step 17 the function key P/YR is operated in order to assign the data item "12" input in step 16 to the relevant variable in the financial mathematical calculation routine. Operations which are used to make assignments to a function key or a variable in a financial mathematical calculation routine are respectively characterized, in FIG. 2 and the subsequent figures, in that next to the respective step the display readout is shown enlarged in comparison with steps which are used merely for data input. Subsequently, the total number of saving periods is stipulated, specifically as shown in FIG. 2 either as per steps 18 and 19 by inputting the years (in the example shown the data item "30") and subsequently operating the function key x P/YR or as per steps 20 and 21 by directly inputting the total number of saving periods (in the example shown the data item "360") and subsequently operating the function key N. When the number of saving periods per annum and the total number of saving periods have been input or determined, an assignment is then made to the relevant variable in the financial mathematical savings plan calculation routine by inputting the interest rate (in the example shown the data item "3") and operating the function key I/YR, as per steps 22 and 23. Within the context of the subsequent steps 24 and 25, the initial capital or starting capital (in the example shown the data item "0") is input and the function key PV is operated in order to make an assignment to the relevant variable. Within the context of the subsequent steps 26, 27 and 28, an assignment is then made to a further variable in the savings plan calculation routine by inputting the installment per period (in the example shown the data item "100" in step 26), by operating the +/− key to stipulate that these are savings installments which are a drain on the investor and not withdrawal installments accruing to the investor (in the example shown the data item "−100" in step 27), and by operating the function key PMT (step 28). Next, the function key FV can be operated as per step 29 in order to ascertain the final capital which can be saved using the previously input data (in the example shown the data item "58.273,69") and to display it in the display 12. At this juncture, it should be pointed out that the order in which the function key assignments are made may be arbitrary. The final capital to be saved can also be prescribed by inputting an appropriate data item, and the savings installment per period can be requested and visually displayed using the savings plan calculation routine, for example. The sequence shown in FIG. 2 is merely an example.

Within the context of the present invention, the keypad 11 of the inventive pocket calculator 10 has further function keys for inputting and/or determining data for a dynamized or dynamic capital repayment calculation routine.

These function keys for the dynamized or dynamic capital repayment calculation routine, particularly savings plan calculation routine, are the function key % D for inputting and/or determining the percentage dynamization rate, the function key Z/D for inputting and/or determining the dynamic initial installment and the function key Z/DE for inputting and/or determining the dynamic final installment for the dynamized capital repayment calculation routine or savings plan calculation routine. As FIG. 1 reveals, the two function keys Z/D and Z/DE have their hardware combined in one key, so that the function key Z/DE cannot be selected until after the dual assignment key 14 has been operated beforehand. When an assignment has been made to one of these further function keys % D or Z/D or Z/DE by inputting an appropriate data item, the data for the other function keys in the dynamized capital repayment calculation routine or savings plan calculation routine can be determined and can be visually displayed in the display 12. This is discussed by way of example with reference to FIGS. 3 and 4.

Figure 3:
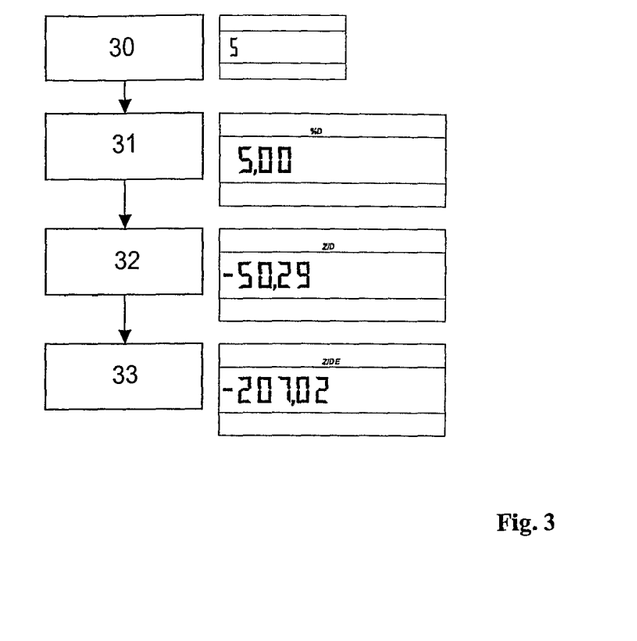
FIG. 3 shows a second flowchart to illustrate the way in which the inventive pocket calculator works.

If, following the example of the non-dynamic savings plan calculation routine in FIG. 2, for example, said routine is intended to be expanded by the functionality of the dynamic analysis then, as shown in FIG. 3, for example, the percentage dynamization rate (in the example shown the data item "5") can be input as per step 30 and the function key % D can be subsequently operated as per step 31 in order to make an assignment to the relevant variable for the dynamized savings plan calculation routine, and the function keys Z/D and Z/DE can subsequently be selected as per steps 32 and 33 in order to ascertain and visually display the dynamic initial savings installment (in the example shown the data item "−50,29") and the dynamic final savings installment (in the example shown the data item "−207,02"), which are necessary in order to attain the final capital (in the example shown the data item "58.273,69") which needs to be saved using the non-dynamized savings plan calculation routine as shown in FIG. 2.

Figure 4:
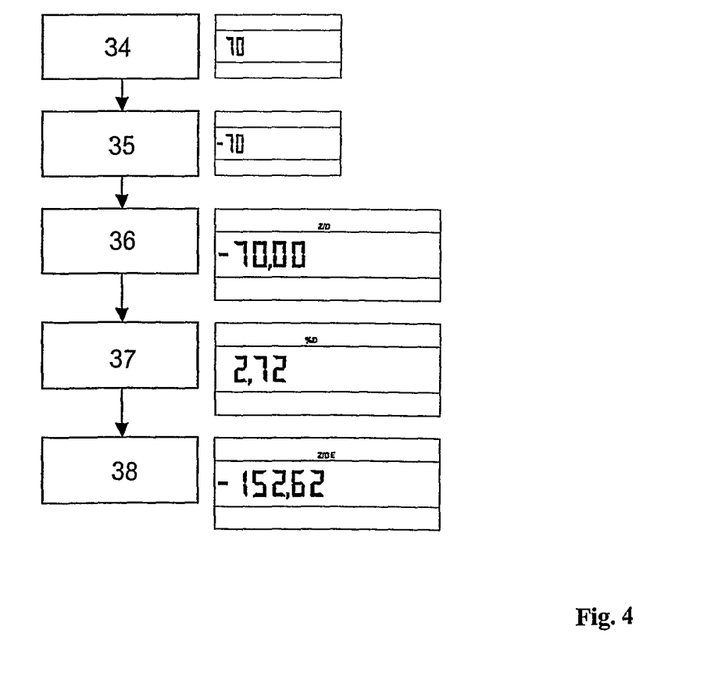
FIG. 4 shows a third flowchart to illustrate the way in which the inventive pocket calculator works.

Similarly, as shown in FIG. 4, a dynamic initial savings installment (in the example shown the data item "−70,00") can be input as per steps 34, 35 and 36 by selecting the function keys % D and Z/DE as per steps 37 and 38 in order to ascertain the percentage dynamization rate (in the example shown the data item "2,72") and the dynamic final savings installment (in the example shown the data item "−152,62"), so as to attain the final capital (in the example shown the data item "58.273,69") to be saved which is ascertained using the non-dynamized savings plan calculation routine as shown in FIG. 2. The exemplary embodiment in FIGS. 3 and 4 again involves purely illustrative examples.

In the example above, all the installments are what are known as advance installments, which are paid at the start of a period. By operating the input key or function key B/E, it is possible to change over to subsequent installments, which are paid at the end of a period.

The financial mathematical pocket calculator based on the invention is a first-time proposal for a pocket calculator which allows the execution of dynamized capital repayment calculation routines. To this end, the keypad incorporates function keys for a dynamized capital repayment calculation routine which are able to receive an assignment for the input of relevant data or are able to be requested by means of selection. The relevant calculation routine is executed in the processor (not shown).

Another special feature of the inventive pocket calculator is that the keypad 11 thereof has a history key JOERS. By operating the history key JOERS several times in succession, previously made function key assignments can be visually displayed in succession and backwards in the display 12. This is described in greater detail below with reference to FIG. 5.

Figure 5:
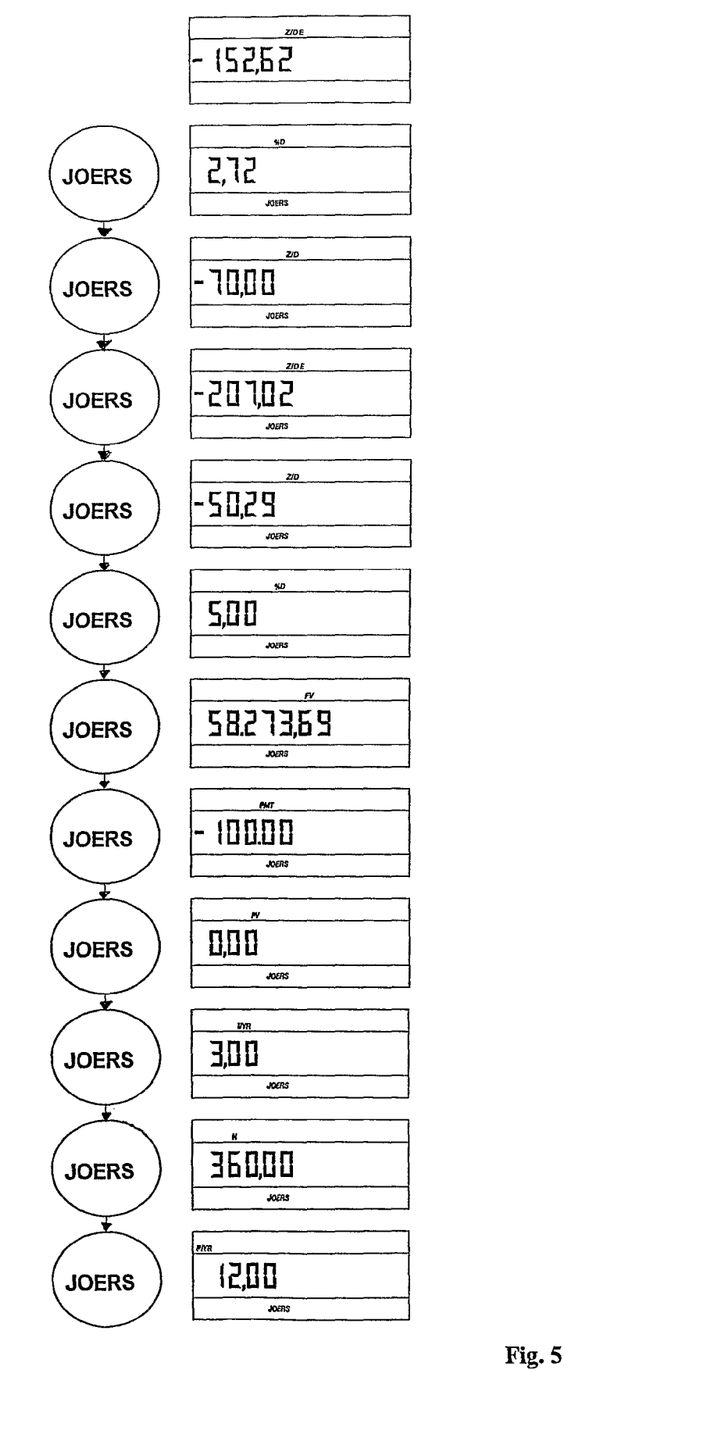
FIG. 5 shows a fourth flowchart to illustrate the way in which the inventive pocket calculator works.

Thus, FIG. 5 shows a plurality of display readouts which correspond to the display readouts following assignment to and request for a function key in the non-dynamized and dynamized capital repayment calculation routine as shown in FIGS. 2 to 4. Subsequent repeated operation of the history key JOERS allows visual display of all previously made function key assignments and requests for a function key in the display in succession and also backwards as per a history function. This provides a user with the first opportunity to operate the history key JOERS in order to check the correctness of previously made inputs and thus to ascertain the plausibility and correctness of the ascertained or calculated data.

In addition to this history key JOERS, the keypad 11 of the inventive pocket calculator 10 comprises a history deletion key JOERS.C, and pressing this history deletion key JOERS.C allows data inputs and function key assignments to be deleted individually on a selective basis.

Besides the aforementioned function keys or input keys for a financial mathematical capital repayment calculation routine, the keypad 11 of the inventive pocket calculator 10 also has function keys for a financial mathematical cashflow calculation routine, which can also be referred to as a payment flow calculation routine. The function keys for the cashflow calculation routine include the function key CFj for inputting the initial capital, the function key P/YR for inputting the number of periodic installments or withdrawals per time interval and the function key Nj for inputting the number of time intervals or the number for how often the cashflow is repeated. The time intervals may be years, quarters or else months. The function key CFj is also used for inputting the absolute value of the periodic installment level or withdrawal level and for inputting the absolute value of the closing installment (closing withdrawal or closing payment), and after assignments have been made to these function keys by inputting appropriate data it is possible to determine the data item for a function key without an assignment IRR/YR for the internal rate of return to be ascertained in the cashflow calculation routine.

As FIG. 1 reveals, the hardware of the function keys CFj and Nj is combined in one key, so that the function key Nj cannot be selected until after the dual assignment key 14 has been operated beforehand.

Within the context of the present invention, the keypad 11 of the inventive pocket calculator 10 is expanded by further function keys for the cashflow calculation routine, namely by a function key I/YR for inputting reinvestment interest for the installments and withdrawals made and a function key TIRR for determining what is known as the true internal rate of return. The hardware of the function keys TIRR and IRR/YR is in turn combined in one key, so that the function key TIRR cannot be selected until after the dual assignment key 14 has been operated beforehand.

Figure 6:
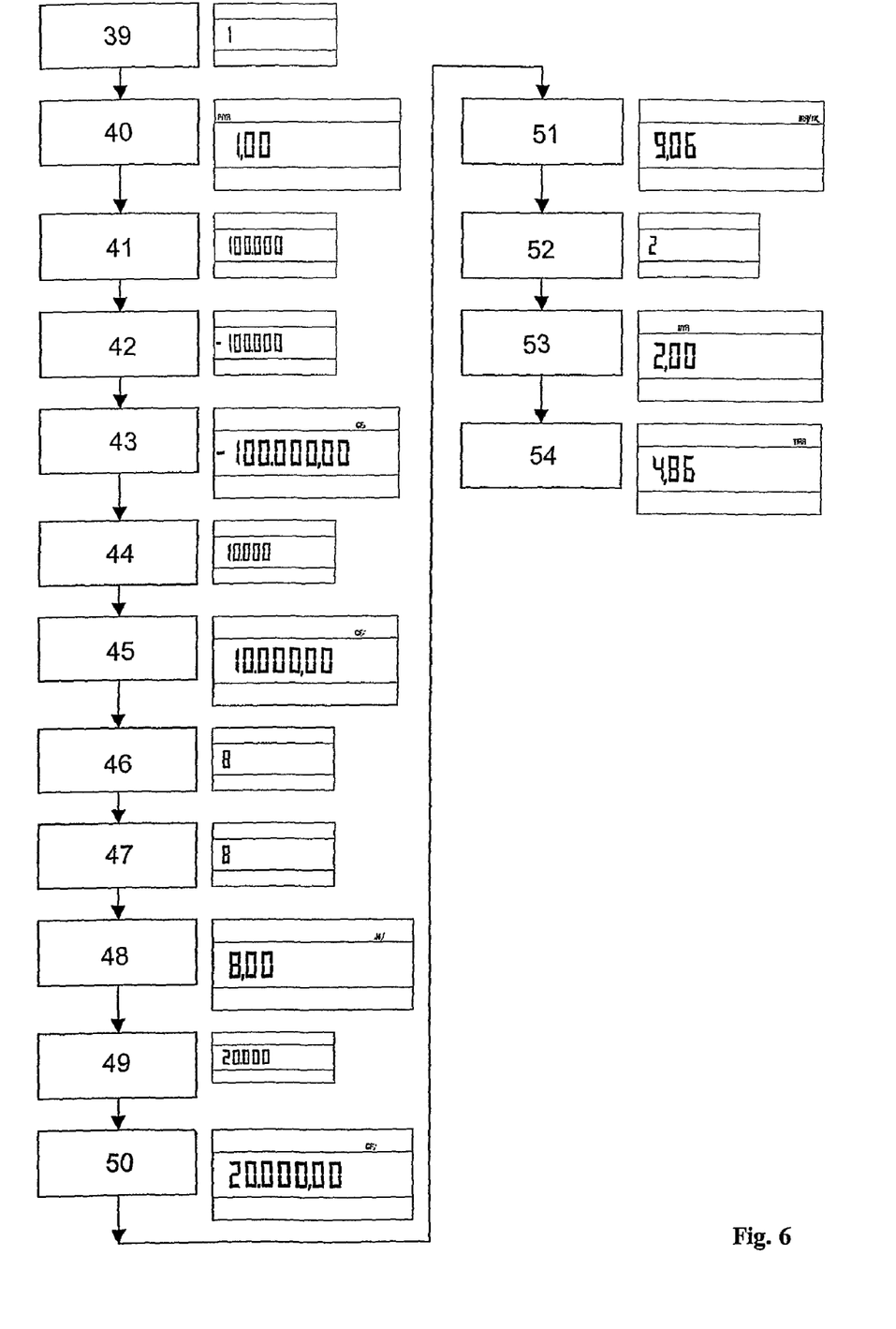
FIG. 6 shows a fifth flowchart to illustrate the way in which the inventive pocket calculator works.
Figure 7:
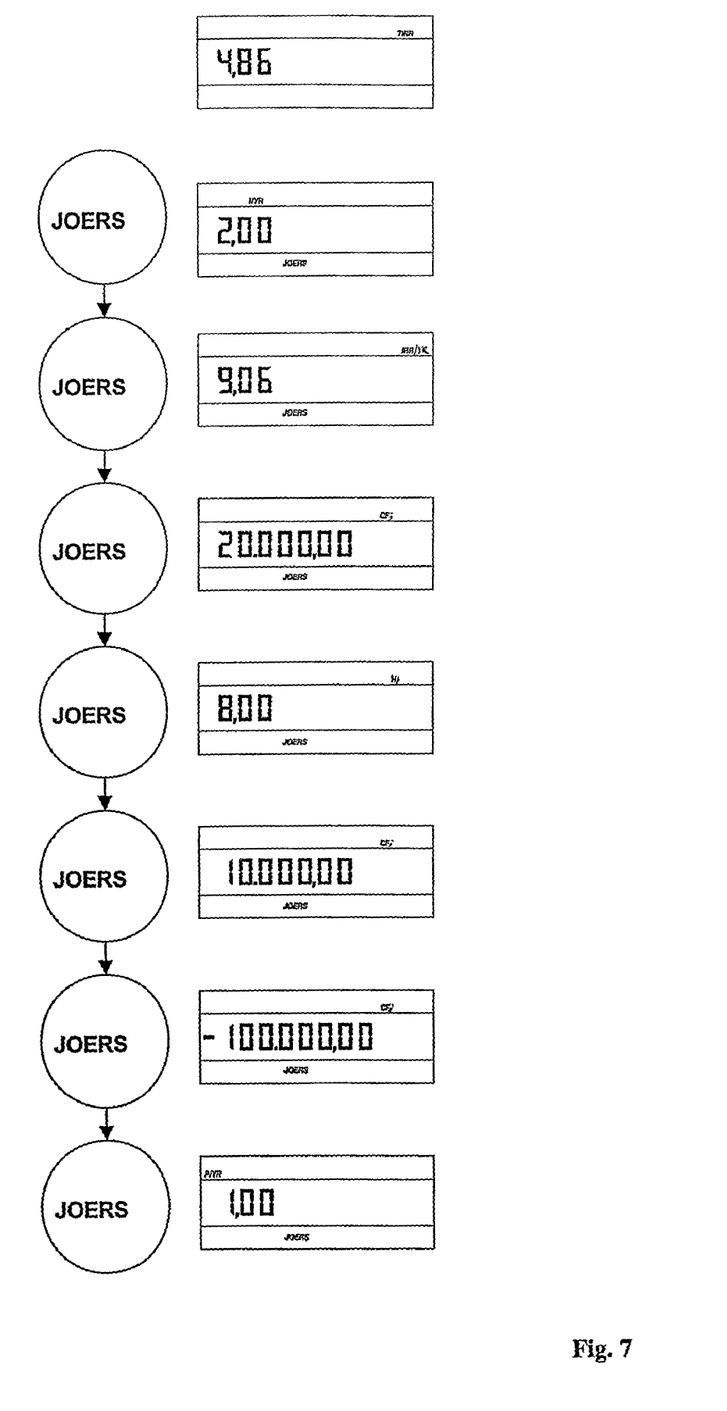
FIG. 7 shows another flowchart to illustrate the way in which the inventive pocket calculator works.

The text below describes the functionality of the inventive pocket calculator 10 in connection with the cashflow calculation routine by way of example with reference to FIG. 6. In a first step 39 of the cashflow calculation routine, the keypad 11 is used to input the number of periodic withdrawals per annum (in the exemplary embodiment shown the data item "1"), with the data item "1" input in step 39 being assigned to the relevant variable in the financial mathematical cashflow calculation routine in step 40 by operating the function key P/YR. Next, an assignment is made to the relevant variable in the financial mathematical cashflow calculation routine as per steps 41, 42 and 43 by inputting the initial capital (in the example shown the data item "−100.000") to be provided by a customer or investor and by subsequently operating the function key CFj. As per steps 44 and 45, an assignment is then made to a further variable in the financial mathematical cashflow calculation routine by inputting the periodic withdrawal level accruing to the customer ("10.000" in the exemplary embodiment shown) and by operating the function key CFj once again. Next, a data item (in the example shown the data item "8") for determining the number of years in which periodic withdrawals are made is input using the keypad 11 as per step 46, and by operating the dual assignment key 14 as per step 47 and subsequently operating the key combining the function keys CFj and Nj as per step 48 an assignment is made to the function key Nj or relevant variable in the financial mathematical cashflow calculation routine. Following input of the closing withdrawal level accruing to the customer (in the exemplary embodiment shown the data item "20.000") as per steps 49 and 50, it is then possible to operate the function key IRR/YR as per step 51 in order to retrieve what is known as the internal rate of return for the cashflow investment plan defined by the above data and to visually display it in the display 12, the internal rate of return having the data item "9,06" in the exemplary embodiment shown.

The inventive pocket calculator 10 can also be used, as per steps 52 and 53, to input reinvestment interest for the withdrawals (in the example shown the data item "2") for all periodic withdrawals accruing to the customer or investor (in the example shown these are eight times 10.000) and to make an assignment to a relevant variable in the financial mathematical cashflow calculation routine by operating the function key I/YR. The reinvestment interest applies to all periodic withdrawals accruing to the customer or investor, in each case up until the time of expiry of the cashflow investment plan, which is defined by the closing withdrawal. By subsequently operating the dual assignment key 14 and the key which combines the function keys IRR/YR and TIRR, it is then possible to determine what is known as a true internal rate of return as per step 54 and to visually display it in the display 12, namely the data item "4,86" in the example shown.

The inventive pocket calculator thus makes this possible, for the first time, to determine the true internal rate of return on the basis of achievable reinvestment interest and in this way to determine actually attainable returns for cashflow investment plans easily and quickly on a pocket calculator.

By operating the history key JOERS several times in succession, previously made function key assignments can again be visually displayed in succession and backwards in the display 12 as shown in FIG. 7, so as again to ascertain the plausibility and correctness of the ascertained data.

Another special feature of the inventive pocket calculator 10 is logical dialog guidance by means of the display 12 such that all assignments to function keys can be visually displayed in the display 12. Thus, as FIGS. 2 to 7 reveal, the display 12 can be used to visually display not only data which have been input but also the function keys to which the input data have been assigned. Thus, by way of example, FIGS. 2, 3, 4 and 6 show that the display 12 is used to display the respective function key with an assignment above the data item which has been input. When the history key JOERS is operated, this is displayed below the respective data item in the display 12.

A user is thus always able to see what data item has been assigned to what variable in a financial mathematical calculation routine or to what function key. In combination with the history key JOERS and the history deletion key JOERS.C, this significantly improves the user friendliness of the inventive pocket calculator.

LIST OF REFERENCE SYMBOLS

10 Pocket calculator
11 Keypad
12 Display
13 Key
14 Dual assignment key
15 Step
16 Step
17 Step
18 Step
19 Step
20 Step
21 Step
22 Step
23 Step
24 Step
25 Step
26 Step
27 Step
28 Step
29 Step
30 Step
31 Step
32 Step
33 Step
34 Step
35 Step
36 Step
37 Step
38 Step
39 Step
40 Step
41 Step
42 Step
43 Step
44 Step
45 Step
46 Step
47 Step
48 Step
49 Step
50 Step
51 Step
52 Step
53 Step
54 Step

The invention claimed is:

1. A pocket calculator for financial mathematical calculation routines, having a keypad (11), comprising a plurality of input keys and function keys, for inputting data, having a memory for storing permanent data and volatile data, having a processor for performing the financial mathematical calculation routines and having a display (12) for displaying data, where the keypad (11) has a plurality of function keys for a capital repayment calculation routine, namely at least a first function key (P/YR) for inputting and/or determining the periods per annum, at least a second function key (N; x P/YR) for inputting and/or determining the total number of periods, a third function key (PV) for inputting and/or determining the initial capital, a fourth function key (I/YR) for inputting and/or determining the interest rate, a fifth function key (PMT) for inputting and/or determining the installments per period and a sixth function key (FV) for inputting and/or determining the final capital, where after assignments have been made to some of these function keys by inputting appropriate data it is possible for the data item for a function key without an assignment to be determined by the capital repayment calculation routine, characterized in that the keypad (11) has further function keys for inputting and/or determining data for a dynamized capital repayment calculation routine, namely a function key (%D) for inputting and/or determining the percentage dynamization rate, a function key (Z/D) for inputting and/or determining the dynamic initial installment and a function key (Z/DE) for inputting and/or determining the dynamic final installment, where when an assignment has been made to one of these further function keys by inputting an appropriate data item it is possible for the data for the remaining further function keys to be determined by the dynamic capital repayment calculation routine.

2. The pocket calculator as claimed in claim 1, characterized in that the hardware of two function keys (Z/D, Z/DE) for inputting and/or determining data for a dynamized capital repayment calculation routine is combined in one key such that it is possible to change back and forth between the respective function keys by operating a separate shift key or dual assignment key (14).

3. The pocket calculator as claimed in claim 1, characterized in that the data for the remaining further function keys can be requested and visually displayed in the display (12) by operating the respective function key.

4. The pocket calculator as claimed in claim 1, characterized in that the keypad (11) has at least one history key (JOERS), and pressing the history key (JOERS) a plurality of times allows function key assignments or data inputs made to be visually displayed in succession and backwards in the display (12).

5. The pocket calculator as claimed in claim 4, characterized in that the keypad (11) has at least one history deletion key (JOERS.C), and operating the history deletion key (JOERS.C) allows function key assignments or data inputs made to be deleted individually.

6. The pocket calculator as claimed in claim 1, characterized in that the keypad (11) has an on key (ON) and an off key (OFF) whose hardware is combined in one key such that the on key (ON) cannot be selected until after a separate shift key or dual assignment key (14) has been operated.

7. The pocket calculator as claimed in claim 1, characterized in that when an assignment has been made to a function key firstly the data item for the function key with the assignment and secondly the respective function key can be visually displayed in the display (12).

8. The pocket calculator as claimed in claim 1, characterized in that the keypad (11) has a plurality of function keys for a cashflow calculation routine, namely a first function key (CFj) for inputting the initial capital, a second function key (P/YR) for inputting the number of periodic installments per time interval and a third function key (Nj) for inputting the number of time intervals, where the first function key (CFj) is also used for inputting the periodic installments and inputting the closing installment, and where when assignments have been made to these function keys by inputting appropriate data it is possible for the data item for a function key without an assignment (IRR/YR) for the internal rate of return to be determined by the cashflow calculation routine, and that the keypad (11) has further function keys, namely a function key (I/YR) for inputting reinvestment interest for the installments and a function key (TIRR) for determining the true internal rate of return, where after an assignment has been made to the function key (I/YR) for inputting the reinvestment interest by inputting an appropriate data item it is possible to determine the data item for the remaining further function keys (TIRR) for determining the true internal rate of return.

9. The pocket calculator as claimed in claim 8, characterized in that the hardware of the two function keys (IRR/YR, TIRR) for the internal rate of return and the true internal rate of return is combined in one key such that it is possible to change back and forth between the respective function keys by operating a separate shift key or dual assignment key (14).

10. A pocket calculator for financial mathematical calculation routines, having a keypad (11), comprising a plurality of input keys and function keys, for inputting data, having a memory for storing permanent data and volatile data, having a processor for performing the financial mathematical calculation routines and having a display (12) for displaying data, where the keypad (11) has a plurality of function keys for a capital repayment calculation routine, namely at least a first function key (P/YR) for inputting and/or determining the periods per annum, at least a second function key (N; x P/YR) for inputting and/or determining the total number of periods, a third function key (PV) for inputting and/or determining the initial capital, a fourth function key (I/YR) for inputting and/or determining the interest rate, a fifth function key (PMT) for inputting and/or determining the installments per period and a sixth function key (FV) for inputting and/or determining the final capital, where after assignments have been made to some of these function keys by inputting appropriate data it is possible for the data item for a function key without an assignment to be determined by the capital repayment calculation routine, characterized in that:

a) the keypad (11) has further function keys for inputting and/or determining data for a dynamized capital repayment calculation routine, namely a function key (% D) for inputting and/or determining the percentage dynamization rate, a function key (Z/D) for inputting and/or determining the dynamic initial installment and a function key (Z/DE) for inputting and/or determining the dynamic final installment, where when an assignment has been made to one of these further function keys by inputting an appropriate data item it is possible for the data for the remaining further function keys to be determined by the dynamic capital repayment calculation routine and to be visually displayed in the display (12);

b) a logical dialog guidance by means of the display (12) is provided in a way that the display (12) can be used to visually display not only data which has been inputed for the function keys but also the function keys to which the input data have been assigned;

c) the keypad (11) has at least one history key (JOERS) and at least one history deletion key (JOERS.C), whereby pressing the history key (JOERS) a plurality of times allows function key assignments or data inputs made to be visually displayed in succession and backwards in the display (12), and whereby operating the history deletion key (JOERS.C) allows function key assignments or data inputs made to be deleted individually.

* * * * *